(12) United States Patent
Ross et al.

(10) Patent No.: US 10,096,068 B1
(45) Date of Patent: Oct. 9, 2018

(54) LAPSE PREDICTING TOOL AND SCORING MECHANISM TO TRIAGE CUSTOMER RETENTION APPROACHES

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

(*) Notice: Subject to any disclaimer, the term of this patent is extended or adjusted under 35 U.S.C. 154(b) by 628 days.

(21) Appl. No.: 14/577,402

(22) Filed: Dec. 19, 2014

Related U.S. Application Data (60) Provisional application No. 61/920,134, filed on Dec. 23, 2013.

(51) Int. Cl.
*G06Q 40/08* (2012.01)

(52) U.S. Cl.
CPC .................................. *G06Q 40/08* (2013.01)

(58) Field of Classification Search
CPC ...................................................... G06Q 40/08
USPC .............................................................. 705/4
See application file for complete search history.

(56) References Cited

U.S. PATENT DOCUMENTS

| | | | | |
|---|---|---|---|---|
| 2010/0318451 A1* | 12/2010 | Niccolini | ........... | G06Q 30/0278 705/35 |
| 2012/0179598 A1* | 7/2012 | Roth | ................... | G06Q 40/025 705/38 |

* cited by examiner

*Primary Examiner* — Edward Chang
(74) *Attorney, Agent, or Firm* — Eric L. Sophir; Dentons US LLP

(57) ABSTRACT

Disclosed here is a triaging system, including a value engine, an analytical engine, a scoring engine, and databases storing internal, external, and retention value data. A value engine may be configured to receive information and determine a value associated with a policy; an analytical engine may be configured to receive information related to one or more factors associated with a policyholder, as well as actuarial relationships between the one or more factors; and a scoring engine may be configured to receive information associated with a policyholder from one or more value engines and analytical engines, and may output a scalar score associated with the retention value of the policyholder. The system may determine the value of retention associated with the policyholder and use this value to build and store a client score, where the client score may be a scalar representation of the value of retaining business with the policyholder.

17 Claims, 4 Drawing Sheets

LAPSE PREDICTING TOOL AND SCORING MECHANISM TO TRIAGE CUSTOMER RETENTION APPROACHES

CROSS-REFERENCE TO RELATED APPLICATIONS

This application claims the benefit of the filing date of the U.S. Provisional Application No. 61/920,134, entitled "Lapse Predicting Tool And Scoring Mechanism To Triage Customer Retention Approaches," filed on Dec. 23, 2013, which is incorporated herein by reference in its entirety.

FIELD OF THE INVENTION

The present disclosure relates in general to policy management systems, and more specifically to systems for customer triaging.

BACKGROUND

Individuals purchase insurance products for a variety of reasons. Examples include ensuring payment of funeral services, providing additional income to the individual's family in case of an accident, or providing financial security to a loved one. These individuals typically pay for the purchased insurance via periodic payments, often through monthly or annual premiums. As individuals face economic hardship, they may not pay one or more of said premiums and the policy may lapse. Generally, lapses in payments result in negotiations with the individuals for continuing with an insurance service, or otherwise terminating the contract. Because of this, these individuals may vary in their value as perceived by the insuring company. The perceived value may play an important role during future transactions, including the discussion of future lapses or the re-underwriting of products. However, determining the value of a policyholder remains a challenge. Often, the determination of the individual's value to the company is a labor intensive, time-consuming endeavor. Thus, there exists a need for methods of computationally predicting the retention value of a policyholder.

SUMMARY

The present disclosure describes a triaging system including one or more modules running on one or more suitable computing devices. In one or more embodiments, a triaging system may include a Value Engine, an Analytical Engine, a Scoring Engine, and one or more suitable databases storing one or more of a set of internal data, a set of external data, and/or a set of retention value data.

In one or more embodiments, a value engine may be configured to receive information and determine a value associated with one or more policies; an analytical engine may be configured to receive information related to one or more factors associated with one or more policyholders, as well as actuarial relationships between the one or more factors; and a scoring engine may be configured to receive information associated with one or more policyholders from one or more value engines and analytical engines, and configured to output one or more scalar scores associated with the retention value of one or more policyholders.

In one or more embodiments, a triaging system may determine cash flows for a policy held by one or more policyholders using any suitable actuarial analyses and may take into account the residual value of new business with the policyholder.

In one or more embodiments, a triaging system may build one or more underwriting models for one or more policyholders using a suitable analytical engine. The system may then proceed to re-underwrite policies associated with the one or more policyholders using the one or more models.

The system may then determine the value of retention by comparing the value of the cash flow associated with the policyholder and the value ascribed to the policyholder after re-underwriting. The system may then use this value to build and store a client score, where the client score may be a scalar representation of the value of retaining business with the policyholder.

Systems and methods described here may provide information beneficial during lapse discussions with policyholders.

In one embodiment, a computer-implemented method comprises determining, by a value engine of a server, a cash flow value for a policy held by a policyholder based upon a residual value of new business; generating, by an analytical engine of the server, an underwriting model for the policyholder; re-underwriting, by a triaging engine of the server, the policy based on the underwriting model; determining, by the triaging engine of the server, a value of retention by comparing the determined cash flow value associated with the policyholder and a value ascribed to the policyholder after re-underwriting the policy; generating, by the triaging engine of the server, a client score for the policyholder based upon the value of retention; and calculating, by the triaging engine of the server, a probability of lapsing by the policyholder.

In another embodiment, a computer executed method comprises determining, by a value engine of a triaging server, a financial value associated with an insurance policy based on a first cash flow for the policy, the insurance policy being issued to the customer based on a first underwriting; performing, by an analytical engine of the triaging server, a second underwriting of the customer for the policy based on an underwriting model associated with the customer and determining a second cash flow for the second underwriting; comparing, by a value engine of the triaging server, the first and second cash flows; and assigning, by the value engine of the triaging server, the retention value to the customer based on the comparison.

In yet another embodiment, a system comprises a server comprising: a value engine of the server configured to determine a cash flow value for a policy held by a policyholder based upon a residual value of new business; an analytical engine of the server configured to generate an underwriting model for the policyholder; a risk analysis module of the server configured to generate a resolution based on the underwriting model; and a triaging engine of the server configured to re-underwrite a product based on the underwriting model, determine a value of retention by comparing the determined cash flow value associated with the policyholder and a value ascribed to the policyholder after re-underwriting, and generate a client score for the policyholder based upon the value of retention.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Policy" refers to any contract insuring a person or goods.

"Policyholder" refers to any entity who holds one or more policies.

"Value" refers to the monetary worth of a person or object.

"Lapse" refers to the inability of a policyholder to pay, at a moment previously agreed with a policy issuer, a cost associated with a policy held.

"Actuarial" refers to relating to a statistical assessment of risk.

"Value of new business" or "VNB", refers to a potential value of new business associated with a policyholder.

"Value of retention" refers to a potential value of maintaining business associated with a policyholder.

"Re-underwriting" refers to the reevaluating of a policyholder for purposes of adjusting benefits or contractual terms.

"Analytical engine" refers to a software module that handles data integration, breaks data streams into atomic parts, executes rules, and performs data matching by using fuzzy logic, among others.

"Underwriting model" refers to an algorithm which measures the risk of a potential customer.

"Factor" refers to information which can be used as a reference for measuring the risk associated with a potential customer. A factor may be information such as age, current health, occupation, among others.

"Financial distress" refers to the condition of being unable to meet, or experiencing difficulty in meeting, financial obligations.

The present disclosure describes a triaging system including one or more modules running on one or more suitable computing devices, where the modules may ascribe a retention value to policyholders.

Figure 1:
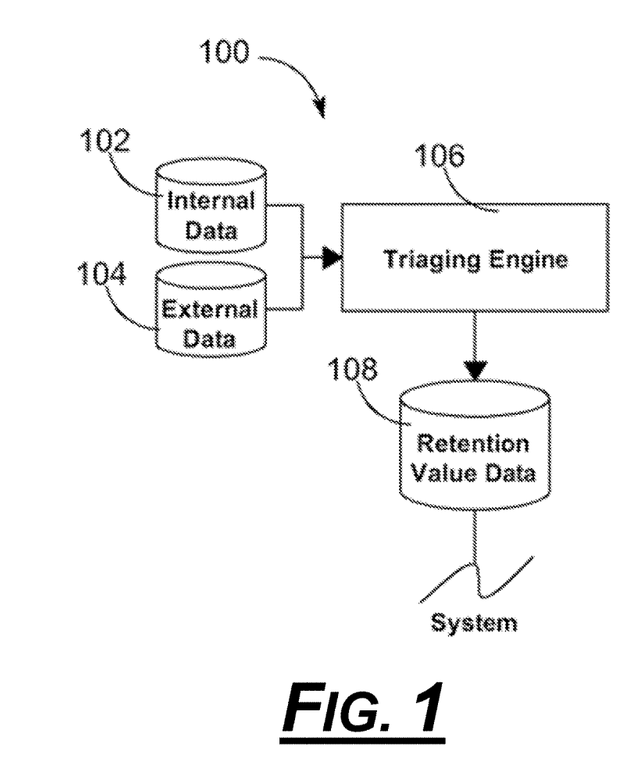
FIG. 1 is a functional block diagram illustrating a triaging system architecture, according to an embodiment.

FIG. 1 is a functional block diagram illustrating a triaging system architecture, according to an embodiment. In FIG. 1, triaging system architecture 100 includes internal database 102, external database 104, triaging engine 106, and retention value database 108. it should be understood that system architecture 100 can include fewer components, additional components, different components, or differently arranged components depending on the desired goals.

In FIG. 1, internal database 102, external database 104, and retention value database 108 are each coupled to and in bi-directional communication with triaging engine 106 via a network connection. Examples of such network connections include intranets, local area networks (LAN), virtual private networks (VPN), wireless area networks (WAN), Bluetooth, Bluetooth Low Energy, Wi-Fi, ZigBee, and the like, including other technologies suitable for establishing a connection between any number of computing devices. In other embodiments, retention value database 108 is coupled to and in communication to other components of a system architecture (not shown) where a triaging system architecture is implemented.

In some embodiments, internal database 102 is implemented as a relational database that receives information internal to a system, stores said information, and retrieves and provides said information to authenticated users. In these embodiments, internal database 102 provides internal data to modules within triaging engine 106 for use in one or more analyses relating to policyholder triaging. Examples of information that is internal to the system include actuarial information previously associated with the one or more policyholders, previous health evaluations of the one or more policyholders, previous object valuations of one or more objects associated with the one or more policyholders, and the like.

In other embodiments, external database 104 is implemented as a relational database that receives information external to a system, stores said information, and retrieves and provides said information to authenticated users. in these embodiments, external database 104 provides external data to modules within triaging engine 106 for use in one or more analyses relating to policyholder triaging. Examples of information that is external to the system include data related to one or more factors associated with one or more policyholders, including age, health history, family history, and occupation, amongst others, as well as actuarial relationships between the one or more factors. In other embodiments, external database 104 is implemented as a data store for unstructured data, and the information stored in external database 104 is processed prior to use in triaging system architecture 100.

In some embodiments, triaging engine 106 is implemented as one or more software modules configured to ascribe a retention value to policyholders. In some embodiments, modules associated with triaging engine 106 are loaded on one or more computing devices, such as for example personal computers, data servers, mobile phones, and tablets, amongst others. Examples of such modules include a value engine, analytical engine, scoring engine, and the like.

In other embodiments, retention value database 112 is implemented as a relational database that receives information relating to the retention value of one or more clients, stores said information, and retrieves and provides said information to authenticated users. In these embodiments, retention value database 112 communicates scores associated with one or more policyholders to components coupled to and in communication with triaging system architecture 100. Examples of information relating to the retention value of one or more clients include scores associated with a client and the like.

In operation, triaging engine 106 receives data relating to one or more policyholders from internal database 102 and external database 104. Triaging engine 106 uses the data to develop a score associated with each of the one or more policyholders, and communicates the scores to retention value database 108. In some embodiments, retention value database 108 stores the scores generated by triaging engine 106 for use by components coupled to and in communication with triaging system architecture 100.

Figure 2:
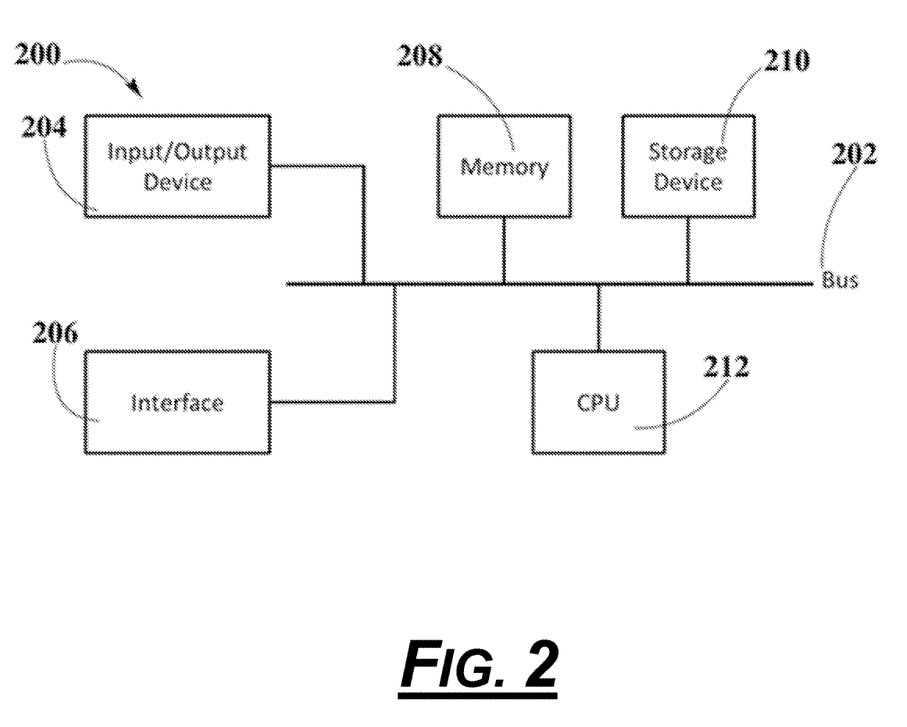
FIG. 2 is a block diagram illustrating an exemplary computing device in which one or more embodiments of the present disclosure may operate, according to an embodiment.

FIG. 2 is an exemplary computing device 200 in which one or more embodiments of the present disclosure may operate, according to an embodiment. In one embodiment, computing device 200 includes bus 202, input/output (I/O) device 204, communication interface 206, memory 208, storage device 210 and central processing unit 212. In another embodiment, computing device 200 includes additional, fewer, different, or differently arranged components than those illustrated in FIG. 2.

In FIG. 2, bus 202 is in physical communication with I/O device 204, communication interface 206, memory 208, storage device 210, and central processing unit 212. Bus 202 includes a path that permits components within computing device 200 to communicate with each other. Examples of I/O device 204 include peripherals and/or other mechanism that may enable a user to input information to computing device 200, including a keyboard, computer mice, buttons, touch screens, voice recognition, and biometric mechanisms, and the like. I/O device 204 also includes a mechanism that outputs information to the user of computing device 200, such as, for example a display, a light emitting diode (LED), a printer, a speaker, and the like.

Examples of communication interface 206 include mechanisms that enable computing device 200 to communicate with other computing devices and/or systems through network connections. Examples of network connections include any suitable connections between computers, such as, for example intranets, local area networks (LANs), virtual private networks (VPNs), wide area networks (WANs), the Internet, and the like. Examples of memory 208 include random access memory 208 (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, Triaging Engine 106, and the like. Examples of these implementations include servers, authorized computing devices, smartphones, desktop computers, laptop computers, tablet computers, a PDAs, another type of processor-controlled device that may receive, process, transmit digital data, and the like. Additionally, computing device 200 may perform certain operations that are required for the proper operation of system architecture 100. Suitable computing devices 200 may perform these operations in response to central processing unit 212 executing software instructions contained in a computer-readable medium, such as memory 208.

In one embodiment, the software instructions of system are read into memory 208 from another memory location, such as storage device 210, or from another computing device 200 (e.g., Triaging Engine 106, and the like) via communication interface 206. In this embodiment, the software instructions contained within memory 208 instructs central processing unit 212 to perform processes that will be described in FIGS. 3-4, below. Alternatively, hardwired circuitry may be used in place of or in combination with software instructions to implement processes described herein. Thus, implementations described herein are not limited to any specific combination of hardware circuitry and software.

Figure 3:
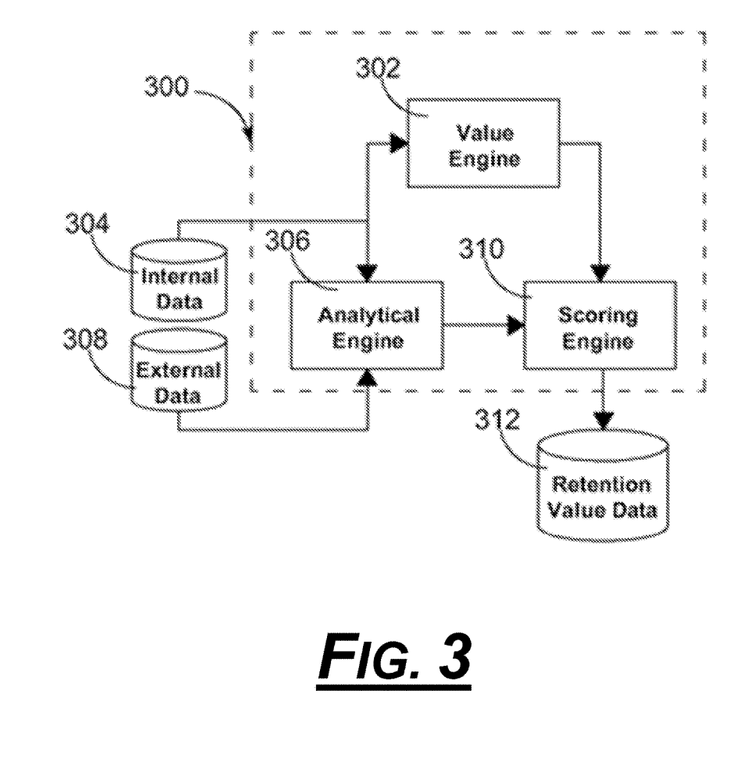
FIG. 3 is a functional block diagram illustrating a triaging engine, according to an embodiment.

FIG. 3 is a functional block diagram illustrating a triaging engine, according to an embodiment. In FIG. 3, triaging engine 300 includes value engine 302, internal data source 304, analytical engine 306, external data source 308, scoring engine 310, and retention value data 312. It should be understood that triaging engine 300 can include fewer components, additional components, different components, or differently arranged components depending on the desired goals. In some embodiments, triaging engine 300 is implemented as triaging engine 106 of FIG. 1, above.

In FIG. 3, internal database 302 is coupled to and in communication with value engine 302 and analytical engine 306 via a network connection. External database 308 is coupled to and in communication with analytical engine 306. Value engine 302, analytical engine 306, and retention value database 312 are coupled to and in communication with scoring engine 310.

In some embodiments and referring to FIG. 1, internal database 302 is implemented as a relational database functioning in a manner substantially similar to internal database 102. In other embodiments, external database 308 is implemented as a relational database functioning in a manner substantially similar to external database 104. In yet other embodiments, retention value database 312 is implemented as a relational database functioning in a manner substantially similar to retention value database 108.

In some embodiments, value engine 302 is implemented as one or more portions of software modules running as part of triaging engine 300. In other embodiments, value engine 302 is configured to receive information from internal database 304, where internal database 304 includes any data storage device loaded with information internal to a system. In yet other embodiments, value engine 302 is configured to determine a value associated with one or more policies held by one or more policyholders using information received from internal database 304.

In other embodiments, analytical engine 306 is implemented as one or more portions of software modules running as part of triaging engine 300. In some embodiments, analytical engine 306 is configured to receive information from internal data source 304 and external data source 308, prepare the information for use in one or more analyses performed by analytical engine 306 and/or scoring engine 310, and perform one or more analyses associated with triaging engine 300. Examples of the analyses associated with triaging engine 300 include actuarial analysis, financial distress analysis, and the like. In these embodiments, external data source 308 includes information derived from components external to a system including triaging engine 300.

In some embodiments, scoring engine 310 is implemented as one or more portions of software modules running as part of triaging engine 300. In other embodiments, scoring engine 110 is configured to receive information from one or more of value engine 302 and analytical engine 306, and uses said information to score one or more policyholders. triaging engine 300 then stores the score determined by scoring engine 310 within retention value database 312, where information in retention value database 312 is made accessible to other components of a system including triaging engine 300.

Figure 4:
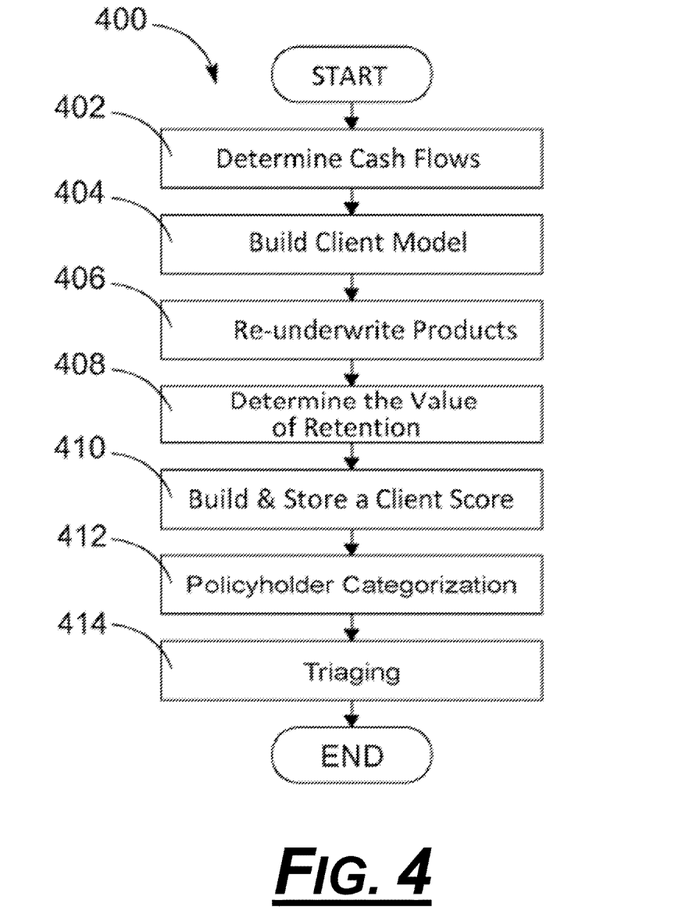
FIG. 4 is a flowchart illustrating a method of policyholder triaging, according to an embodiment.

FIG. 4 is a flowchart illustrating a method of policyholder triaging, according to an embodiment. In some embodiments, policyholder triaging 400 begins by performing actions to determine cash flows 402 for a policy held by one or more policyholders. In an example, a value engine, such as for example value engine 302, carries out instructions to determine cash flows 402 for a policy held by one or more policyholders. In some embodiments, value engines include actuarial analyses when determining a policy's value. In other embodiments, value engines take into account the residual value of new business (RVNB) with the policyholder to determine the cash flows.

Policyholder triaging 400 then continues to build client model 404. In an example, an analytical engine, such as for example analytical engine 306, carries out instructions to build client model 404. In some embodiments, the analytical engine uses a set of internal and external data to develop an underwriting model for the one or more policyholders. In this step, an analytical engine may emulate the resolution patterns of top performing underwriters by using statistical learning techniques, such as support vector machine, logistic regression, and the like. In some embodiments, the aforementioned techniques assume a linear or nonlinear relationship between factors and risk classes. In other embodiments, a nonlinear relationship between factors and risk classes is preferred. In yet other embodiments, other techniques within the space of artificial intelligence are employed, such as for example expert systems, fuzzy logic, and the like. In these embodiments, the aforementioned techniques operate based on a defined set of underwriting standards set by the company, including possible enhancements using third party data, as well as best practices derived from the top performing underwriters within the company. In some embodiments, the risk analysis module provides a resolution. Examples of such a resolution include a risk classification or a risk of loss assessment. In some embodiments, the company periodically updates its underwriting standards and best underwriting practices so that an underwriting heuristic module (not shown) keeps improving the quality of its output over time.

Policyholder triaging 400 continues to re-underwrite products 406. In an example, a triaging engine, such as for example triaging engine 300, carries out instructions to re-underwrite products 406 using the model developed. In some embodiments, an analytical engine module with the triaging engine re-underwrites policyholders by performing an actuarial analysis, determining a coverage value associated with the policy, and determining the costs associated with the policy, and the like.

Subsequently, policyholder triaging 400 continues to determine the value of retention 408. In an example, a triaging engine, such as for example triaging engine 300, carries out instructions to determine the value of retention 408 by comparing the value of the cash flow associated with the policyholder and the value ascribed to the policyholder after re-underwriting. In some embodiments, the value of retention may be proportional to the difference of the re-underwritten value and the RVNB.

Subsequently, policyholder triaging 400 continues to build and store a client score 410. In an example, a triaging engine, such as for example triaging engine 300, carries out instructions use the value of retention to build and store a client score 410. In some embodiments, the client score may be a scalar representation of the value of retaining business with the policyholder. In other embodiments, the client score may be a scalar representation of probability of a client lapsing by quantifying the client's financial distress. In these embodiments, a client's degree of financial distress can be derived from external or internal data, including the client's credit score, historical lapse data, census data, customer support logs, and the like. In some embodiments, a client's degree of financial distress is derived from information regarding the client's source of income and the state of the market from which clients obtain their income.

Next, policyholder triaging 400 continues to policyholder categorization 412. In an example, a triaging engine, such as triaging engine 300, performs policyholder categorization 412 by assigning a category, from a set of two or more categories, to one or more policyholders represented by data within a retention value database. In an example, a category set includes a category associated with policyholders with which the company wishes to continue to pursue business, a category associated with policyholders with which the company no longer wishes to pursue business, and a category associated with policyholders with which the company wishes to reduce business. In this example, the category the policy is associated with is determined by comparing the score associated with the policyholder within a retention value database to a predetermined threshold (e.g., RVNB).

Subsequently, Policyholder Triaging 400 continues to Triaging 414. In an example, a system displays a score, category, or other representation associated with a policyholder's value and financial stress to a user. In some embodiments, the system allows a user to triage customer retention approaches according to the value associated with the policyholder.

Example #1 is a system including a triaging system employed in an insurance firm using a call center to follow up lapses. In this example, policyholders are individually scored from 1 to 5 (from least valuable to most valuable) by a triaging system. The scores are associated with a unique identifier which is presented to the call center representatives when interacting with the policyholders. In this example, the triaging system additionally associates the unique identifier with a score ranging from 1 to 5 indicative of the perceived financial distress of the policyholders, and may be used to evaluate the probability of a policyholder lapsing. The call center representative may then have additional insight during the call, and may use the score to provide differentiated responses depending on the policyholder's scores.

In this example, a policyholder with a value score of 5 and a financial stress score of 3 lapses in a payment associated with a high value policy. The customer representative proceeds to call the user and negotiate with the user in order to convince the user to continue using the company's services. In this example, the user changes to a policy with a diminished value that is more closely aligned with their current financial situation.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
    querying, by a server, one or more internal and external databases comprising data of a plurality of customers and users to retrieve information corresponding to each of the plurality of customers and users, wherein the one or more external databases comprise unstructured data;
    determining, by the server, a cash flow value for a policy dataset corresponding to each of the plurality of customers;
    generating, by the server, a heuristic computer-generated model based at least on data corresponding to a performance value of one or more users of the plurality of users, the heuristic computer-generated model configured to utilize a support vector machine algorithm to emulate a resolution pattern of the plurality of users having the performance value greater than a pre-determined threshold value;
    continuously querying, by the server, the one or more internal databases and the external databases to determine any modification of the information corresponding to the one or more users having the performance value greater than the pre-determined threshold value;
    continuously updating, by the server, the heuristic computer-generated model based on a modification of the information corresponding to each of the one or more users having the performance value greater than the pre-determined threshold value, whereby the heuristic computer-generated model improves quality of an output of the resolution pattern emulation with each instance of updating the heuristic computer-generated model;
    re-generating, by the server, the policy dataset for each of the one or more customers by applying the policy dataset to the updated heuristic computer-generated model;
    determining, by the server, a value of retention by comparing the determined cash flow value associated with each of the one or more customers and a value ascribed to each of the one or more customers after re-generating the policy dataset;
    generating, by the server, a client score for each of the one or more customers based upon the value of retention for each of the one or more customers;
    receiving, by the server in connection with a call center, a call from a first customer of the one or more customers;
    identifying, by the server, the first customer based on a unique identifier associated with the call; and
    during the call and while a representative is interacting with the first customer, presenting, by the server, the client score corresponding to the first customer identified based on the unique identifier to the representative.

2. The method according to claim 1, wherein the client score is a scalar representation of the value of retention of each of the one or more customers.

3. The method according to claim 1, wherein generating comprises emulating resolution patterns of the one or more users.

4. The method according to claim 3, wherein the one or more users are highest performing one or more users in the plurality of users.

5. The method according to claim 1, wherein the heuristic computer-generated model is based upon a linear relationship between factors and risk classes.

6. The method according to claim 5, wherein the factors include at least one of age, current health, and occupation of the one or more customers.

7. The method according to claim 1, wherein the heuristic computer-generated model is based upon a nonlinear relationship between factors and risk classes.

8. The method according to claim 7, wherein the factors include at least one of age, current health, and occupation of the one or more customers.

9. The method according to claim 1, wherein re-generating the policy dataset based on the heuristic computer-generated model generates a resolution, and wherein the resolution comprises a risk classification.

10. The method according to claim 1, wherein re-generating the policy dataset based on the heuristic computer-generated model generates a resolution, and wherein the resolution comprises a risk of loss assessment.

11. The method according to claim 1, further comprising periodically updating, by the server, a set of standards to improve the heuristic computer-generated model.

12. The method according to claim 1, wherein the value of retention is proportional to a difference of the value ascribed to each of the one or more customers.

13. The method according to claim 1, wherein determining the flow value associated with each of the one or more customers comprises quantifying an amount of distress of each of the one or more customers.

14. The method according to claim 13, wherein the amount of distress of each of the one or more customers is derived from data selected from a group consisting of a credit score, historical lapse data set, census data, and customer support logs.

15. The method according to claim 13, wherein the amount of distress of each of the one or more customers is derived from information regarding a source of income of each of the one or more customers and a state of a market from which each of the one or more customers obtains income.

16. A computer executed method comprising:
determining, by a server, a cash flow value associated with a product dataset, the product being issued to a customer based on execution of a heuristic computer-generated model, wherein the heuristic computer-generated model is generated based at least from data collected from a database of one or more users of a plurality of users having a performance value greater than a pre-determined threshold value, wherein the computer-generated model is configured to utilize a support vector machine algorithm to emulate the one or more users having the performance value greater than a pre-determined threshold value; wherein the server periodically update the heuristic computer-generated model based on modification of information regarding the one or more users having the performance value greater than the pre-determined threshold value, wherein the server periodically queries the database to determine modification information, whereby the heuristic computer-generated model improves quality of an output of the emulation with each instance of updating the heuristic computer-generated model;
re-generating, by the server, the product dataset for the customer by applying the policy dataset on the updated computer-generated model;
determining, by the server, a value of retention by comparing the determined flow value associated with the customer and a value ascribed to the customer after re-generating the policy dataset;
generating, by the server, a client score for the customer based upon the value of retention for the customer;
receiving, by the server in connection with a call center, a call from the customer;
identifying, by the server, the customer based on a unique identifier associated with the call; and
during the call and while a representative is interacting with the customer, presenting, by the server, the client score corresponding to the customer identified based on the unique identifier to the representative.

17. A system comprising:
a server comprising:
a value engine of the server configured to query one or more internal and external databases comprising data of a plurality of users and customers to retrieve policy information corresponding to each of the plurality of customers and determine a cash flow value for a policy dataset held by each of the plurality of customers, wherein the one or more external databases comprises unstructured data;
an analytical engine of the server configured to generate a heuristic computer-generated model based at least on data corresponding to a performance value of one or more users of the plurality of users, the heuristic computer-generated model configured to utilize a support vector machine algorithm to emulate the one or more users having the performance value greater than a pre-determined threshold value and periodically update the computer-generated model based on modification of information regarding the one or more users having the performance value greater than the pre-determined threshold value, wherein the analytical engine of the server periodically queries the internal database and the external database to determine modification information, whereby the heuristic computer-generated model improves quality of an output of the emulation with each instance of updating the heuristic computer-generated model;
a triaging engine of the server configured to re-generate the policy dataset for each of the one or more customers based by applying the policy dataset to the updated computer-generated model, determine a value of retention by comparing the determined flow value associated with each of the one or more customers and a value ascribed to each of the one or more customers after re-generating the policy dataset, generate a client score for each of the one or more customers based upon the value of retention for each of the one or more customers; receive a call from a first customer of the one or more customers; identify the first customer based on a unique identifier associated with the call; and during the call and while a representative is interacting with the first customer, present the client score corresponding to the first customer identified based on the unique identifier to the representative.

\* \* \* \* \*